United States Patent Office

MATTHEW C. EDEY, OF NEW YORK, N. Y.

Letters Patent No. 76,176, dated March 31, 1868.

IMPROVED MEDICAL COMPOUND.

*The Schedule referred to in these Letters Patent and making part of the same.*

---

TO ALL WHOM IT MAY CONCERN:

Be it known that I, MATTHEW C. EDEY, of New York, in the county of New York, in the State of New York, have invented a new and improved Medicinal Compound; and I do hereby declare that the following is a full and exact description thereof.

The nature of my invention consists in mixing carbolic acid with preparations of sugar, in such manner that the unpleasant taste of the acid is modified, and a compound containing carbolic acid is obtained, of a convenient form, without any detriment to the active and useful properties of the acid, when it is to be administered as a medicine.

To enable others skilled in the art to make and use my invention, I will now describe it more minutely.

I mix a suitable quantity, say from one to ten grains to one pound of sugar, of carbolic acid with sugar, and water, if necessary, and then follow the ordinary processes of the manufacture of confectionery, to bring the mixture into the form of lozenges, sticks, drops, or pills. Or, instead of adding the acid in the beginning, I mix it with the sugar at any point of its manufacture into confectionery, whenever the sugar is in a fluid condition. No other directions seem necessary for the preparation of my compounds, when it is understood that my object is simply to produce articles of confectionery which, when finished, shall contain carbolic acid. As the acid is volatile, and, in practice, acts like essential oils with sugar, it will readily be observed that it may be combined with sugar in any of the ways which are applicable to the essential oils.

As to the amount of carbolic acid to be used in the confectionery, regard must be had to the specific use for which the medicine is intended. The manufacturer may safely use his discretion. I would only remark that the quantity of acid should never be so large as to make it offensive to the taste or smell.

What I claim as my invention, and desire to secure by Letters Patent, is—

The medicinal compound above described.

MATTHEW C. EDEY. [L. S.]

Witnesses:
A. N. RODGERS,
CHARLES J. EAMES.